United States Patent
Nakao et al.

(10) Patent No.: US 9,942,694 B2
(45) Date of Patent: Apr. 10, 2018

(54) INFORMATION TRANSMISSION/RECEPTION SYSTEM AND TERMINAL APPARATUS

(71) Applicant: THE UNIVERSITY OF TOKYO, Tokyo (JP)

(72) Inventors: Akihiro Nakao, Tokyo (JP); Masayuki Umeda, Tokyo (JP); Eiji Miyagaki, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 14/558,566

(22) Filed: Dec. 2, 2014

(65) Prior Publication Data

US 2015/0156602 A1 Jun. 4, 2015

(30) Foreign Application Priority Data

Dec. 3, 2013 (JP) .................................. 2013-250572
Dec. 2, 2014 (JP) .................................. 2014-244480

(51) Int. Cl.
*H04W 4/00* (2018.01)

(52) U.S. Cl.
CPC .................................. *H04W 4/008* (2013.01)

(58) Field of Classification Search
CPC .......................... H04W 4/008; H04M 2250/02
See application file for complete search history.

(56) References Cited

U.S. PATENT DOCUMENTS

| | | | |
|---|---|---|---|
| 5,530,700 A * | 6/1996 | Tran | H04W 74/0833 370/341 |
| 6,957,224 B1 | 10/2005 | Megiddo et al. | |
| 2002/0019712 A1* | 2/2002 | Petite | G01D 4/004 702/61 |
| 2005/0105474 A1* | 5/2005 | Metzler | H04L 43/0835 370/252 |
| 2005/0232281 A1* | 10/2005 | Rosenzweig | H04L 12/185 370/400 |
| 2007/0110009 A1 | 5/2007 | Bachmann et al. | |
| 2008/0247355 A1* | 10/2008 | Ahn | H04L 45/18 370/328 |
| 2009/0204859 A1* | 8/2009 | Cousins | G06F 11/1004 714/701 |
| 2010/0091846 A1 | 4/2010 | Suzuki et al. | |

(Continued)

OTHER PUBLICATIONS

Apple Inc., "Location and Maps Programming Guide", Mar. 10, 2014, p. 8, pp. 22-32.

(Continued)

*Primary Examiner* — Cindy Trandai (57) ABSTRACT

An information transmission apparatus 2 makes transmission objective data redundant using a predetermined method, divides the redundant data into N (N≥2) data elements, the transmission objective data being reproducible on the basis of any arbitrary combination of m (m<N) or more data elements, and sequentially transmits short-range communication signals respectively including the N data elements obtained by the division. A terminal apparatus 3 which receives the data elements tries to reproduce the data using the received data elements, and transmits short-range communication signals including the received data elements.

7 Claims, 3 Drawing Sheets

(56) References Cited

U.S. PATENT DOCUMENTS

| | | | | |
|---|---|---|---|---|
| 2010/0121982 | A1* | 5/2010 | Sumiyoshi | H04N 7/17336 709/246 |
| 2012/0093027 | A1* | 4/2012 | Asano | H04L 43/0894 370/253 |
| 2012/0155531 | A1* | 6/2012 | Yi | H03M 13/356 375/240 |
| 2013/0155947 | A1* | 6/2013 | Curlander | H04W 4/006 370/328 |
| 2013/0188538 | A1* | 7/2013 | Kainulainen | G01S 3/48 370/310 |
| 2014/0073252 | A1* | 3/2014 | Lee | H04W 4/008 455/41.2 |
| 2014/0112340 | A1* | 4/2014 | Shin | H04B 7/15592 370/389 |
| 2016/0066212 | A1* | 3/2016 | Visweswara | H04W 28/065 370/474 |
| 2016/0164759 | A1* | 6/2016 | Satoda | H04L 65/605 709/224 |
| 2017/0006538 | A1* | 1/2017 | Liu | H04W 48/20 |
| 2017/0034647 | A1* | 2/2017 | Takeuchi | H04W 4/008 |
| 2017/0034856 | A1* | 2/2017 | Takeuchi | H04W 76/002 |

OTHER PUBLICATIONS

The Non-Final Office Action for the U.S. Appl. No. 14/405,380, dated Mar. 7, 2016.

The Final Office Action for the U.S. Appl. No. 14/405,380, dated Sep. 16, 2016.

The Advisory Action for the U.S. Appl. No. 14/405,380, dated Dec. 14, 2016.

James S. Plank et al. "A Performance Evaluation and Examination of Open-Source Erasure Coding Libraries for Storage", FAST '09 Proceedings of the 7th USENIX Conference on File and Storage Technologies, Feb. 24-27, 2009, pp. 253-265, USENIX Association Berkeley, CA, USA.

* cited by examiner

ND TERMINAL APPARATUS

INFORMATION TRANSMISSION/RECEPTION SYSTEM AND TERMINAL APPARATUS

CROSS-REFERENCES TO RELATED APPLICATION

Japanese Patent Application No. 2013-250572 and Japanese Patent Application No. 2014-244480, are incorporated by reference herein.

FIELD OF THE DISCLOSURE

The present disclosure relates to an information transmission/reception system and a terminal apparatus.

RELATED ARTS

Recently, a technology referred to as BLE (Bluetooth Low Energy) has been designed, as a technology for performing Bluetooth (registered trademark) communication at lower energy consumption. In this technology, upon starting communication, a communication device broadcasts a specific packet (which is usually referred to as an advertisement packet).

Thus, there has been thought of an example of including preset identification information in the advertisement packet, and processing by a specific application at a terminal side which has received the advertisement packet including the identification information (Apple Inc., "Location and Maps Programming Guide", p. 8, pp. 21-30, 2013-10-24).

SUMMARY OF THE DISCLOSURE

However, according to the conventional technology, there are drawbacks such that, because of the limitation regarding the size of the advertisement packet, transmitting an advertisement packet by including an arbitrary message therein, is impossible, and thus, the application range of this technology is limited.

The present disclosure has been made in view of the above drawbacks. One of the objects of the present disclosure is to provide an information transmission/reception system and a terminal apparatus in which short-range communication signals, such as advertisement packets of BLE, can be effectively used. A terminal apparatus according to an embodiment of the present disclosure comprises a reception unit which receives data elements from an information transmission apparatus, the information transmission apparatus making transmission objective data redundant using a predetermined method, dividing the redundant data into N (N≥2) data elements, the transmission objective data being reproducible on the basis of any arbitrary combination of the m (m<N) or more data elements among the N data elements, and sequentially transmitting short-range communication signals which respectively include the N data elements obtained by the division, a processor which performs a process for trying the reproduction of the data using the received data elements, and a transmission unit which transmits the short-range communication signals including the received data elements.

EMBODIMENTS

Figure 1:
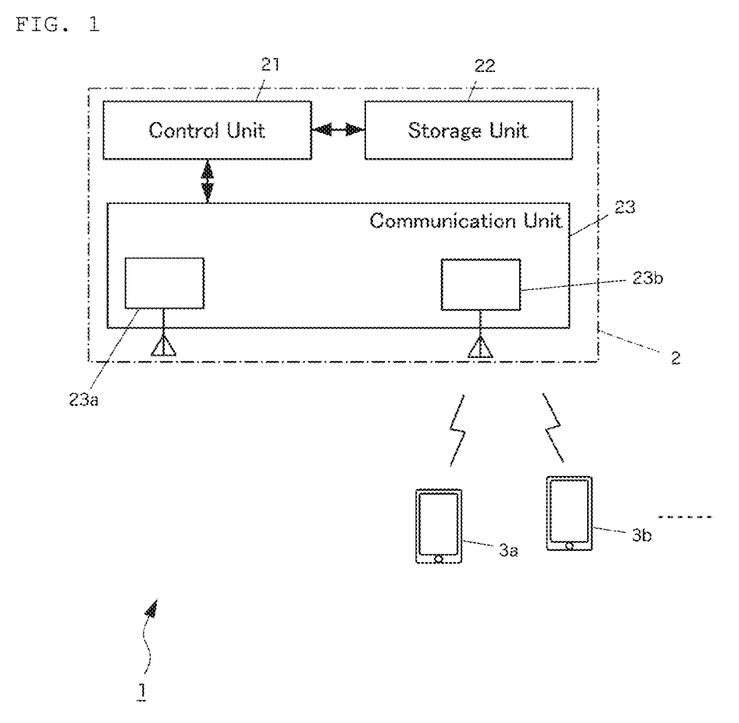
FIG. 1 is a block diagram showing a constitution example of an information transmission/reception system according to an embodiment of the present disclosure.

An embodiment of the present disclosure will be explained with reference to the drawings. As shown in FIG. 1, an information transmission/reception system 1 according to an embodiment of the present disclosure is constituted by comprising an information transmission apparatus 2, and at least one terminal apparatus 3a, 3b, . . . .

As exemplified in FIG. 1, the information transmission apparatus 2 is constituted by comprising a control unit 21, a storage unit 22, and a communication unit 23. As exemplified in FIG. 2, the terminal apparatus 3 is constituted by comprising a control unit 31, a storage unit 32, an operation unit 33, display unit 34, and a communication unit 35.

Here, the control unit 21 of the information transmission apparatus 2 is a program-controlled device such as a CPU, etc., and operates in accordance with a program stored in the storage unit 22. According to the present embodiment, the control unit 21 makes the transmission objective data redundant by a predetermined method. Namely, the control unit 21 divides the transmission objective data into N (N is an integer satisfying N≥2) data elements. Here, the control unit 21 divides the transmission objective data (original data) in a way so that the transmission objective data is reproducible on the basis of any arbitrary combination of m (m is an integer satisfying m<N) or more data elements among the N data elements. In accordance with the control by the control unit 21, the communication unit 23 sequentially transmits short-range communication signals each of which includes each of the N data elements obtained by the division. The content of the specific process of the control unit 21 will be described below. Here, the short-range communication signal may be specifically a BLE advertisement packet, etc., is a signal which can be transmitted/received without requiring any authentication or connection processes.

The storage unit 22 is a memory device or a disk device or the like, and holds a program to be executed by the control unit 21. The program may be provided by being stored in a non-transitory computer readable recording medium such as a DVD-ROM, etc., and copied to the storage unit 32. In addition, the storage unit 22 also operates as a work memory of the control unit 21. According to an example of the present embodiment, the storage unit 22 may hold the transmission objective data. The transmission objective data is arbitrarily set by a manager of the information transmission apparatus 2.

The communication unit 23 comprises a short-range communication unit 23a corresponding to the short-range communication such as Bluetooth, etc., and transmits short-range communication signals such as low-power Bluetooth (BLE), etc., under the control of the control unit 21. As shown in FIG. 1, the information transmission apparatus 2 may be provided with an information input/output device such as an USB (Universal Serial Bus) terminal. The communication unit 23 may comprise a wireless LAN communication unit 23b, which performs communication through a wireless LAN (Local Area Network).

When the communication unit 23 comprises the wireless LAN communication unit 23b, the wireless LAN communication unit 23b outputs information, which has been received through a wireless LAN, to the control unit 21. Also, in response to commands input from the control unit 21, the wireless LAN communication unit 23b externally transmits the transmission objective information through the wireless LAN.

Figure 2:
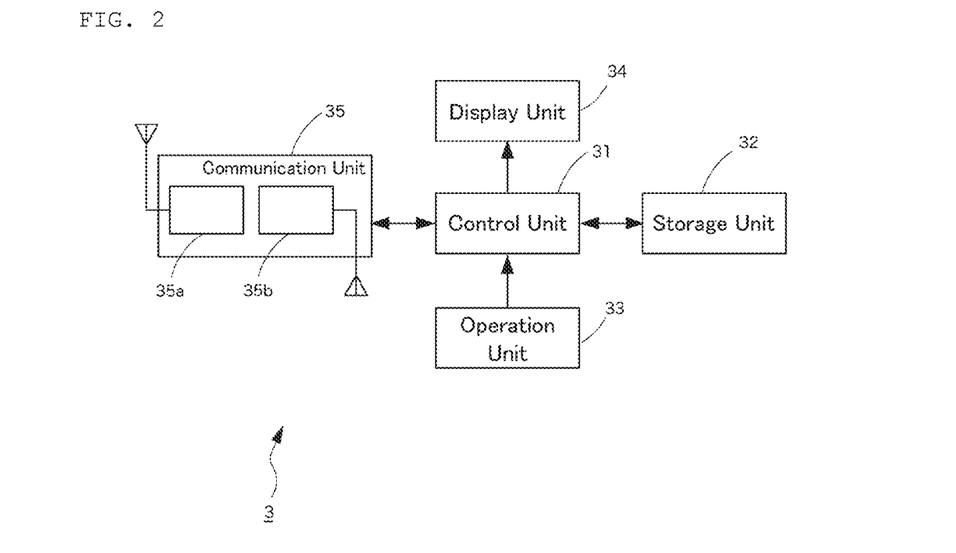
FIG. 2 is a block diagram showing a constitution example of a terminal apparatus according to an embodiment of the present disclosure.

The terminal apparatus 3 may be, for example, what is usually referred to as a smartphone. The control unit 31 of the terminal apparatus 3 is a program-controlled device such as a CPU, etc., and operates in accordance with a program stored in the storage unit 32. According to the present embodiment, the control unit 31 receives short-range communication signals transmitted from the information transmission apparatus 2, and extracts data elements from the short-range communication signals. Then, using the extracted data elements, the control unit 31 tries the reproduction of the data. The control unit 31 controls the communication unit 35 in a way so that the communication unit 35 transmits short-range communication signals including data elements, which have been received from the information transmission apparatus 2 or other terminal apparatus 3. The operations of the control unit 31 will be explained in detail below.

The storage unit 32 is a memory device or the like, and holds a program to be executed by the control unit 31. The program may be provided by being stored in a non-transitory computer readable recording medium such as a DVD-ROM, etc., and copied to the storage unit 32. The program may be downloaded from a network, etc., and stored in the storage unit 32. In addition, the storage unit 32 also operates as a work memory of the control unit 31.

The operation unit 33 is, for example, a touch panel or the like, which receives an instruction operation of a user, and outputs the content of the instruction operation to the control unit 31. The display unit 34 is a liquid crystal display or the like, which displays information in response to the instructions input from the control unit 31.

The communication unit 35 comprises a short-range communication unit 35a of Bluetooth (BLE), etc. Also, the communication unit 35 may comprise a wireless LAN communication unit 35b, etc., which performs communication through a wireless LAN. The short-range communication unit 35a receives short-range communication signals transmitted from the information transmission apparatus 2 or other terminal apparatus 3, and output the short-range communication signals to the control unit 31. Also, the short-range communication unit 35a transmits short-range communication signals, under the control of the control unit 31.

Further, when communication unit 35 comprises the wireless LAN communication unit 35b, the wireless LAN communication unit 35b outputs information, which has been received through the wireless LAN, to the control unit 31. Also, in response to commands input from the control unit 31, the wireless LAN communication unit 35b externally transmits the transmission objective information through the wireless LAN.

Next, basic operations of the control unit 21 of the information transmission apparatus 2 will be explained. As exemplified in FIG. 3, the control unit 21 of the present embodiment functionally comprises a data acquisition unit 51, a dividing unit 52, and a transmission unit 53. Here, data acquisition unit 51 reads out transmission objective data which is stored in, for example, the storage unit 22. Also, the data acquisition unit 51 may receive transmission objective data through the wireless LAN communication unit 35b.

Figure 3:
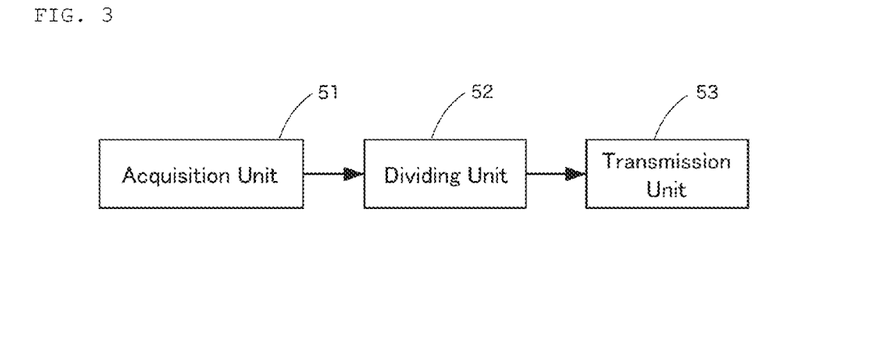
FIG. 3 is a functional block diagram showing an example of an information transmission apparatus according to an embodiment of the present disclosure.

The dividing unit 52 makes the data acquired by the data acquisition unit 51 redundant by a predetermined method, and divides the redundant data into N-pieces (N is a integer of N≥2) of divided data, the transmission objective data being reproducible on the basis of any arbitrary combination of m-pieces (m is a integer where m<N) or more divided data.

According to an example of the present embodiment, the dividing unit 52 performs the process using, for example, an erasure code. However, the present embodiment is not limited to the use of the erasure code, and various block coding methods, may be applied. Specifically, an example of the processes by the dividing unit 52 may be as follows. Namely, assuming that a plurality of transmission objective data streams d0, d1, d2, d3, . . . , do are provided, the dividing unit 52 calculates a linear combination sum regarding the combinations of the bit streams.

Assume a column vector having transmission objective data di as elements, as Mathematical Formula 1.
[Mathematical Formula 1]

$$\vec{d} = (d_1, \ldots, d_n)^T \quad (1)$$

In Mathematical Formula 1, T means transposition. Assuming that this transmission objective data is encoded, N(>n) pieces of encoded data are represented by ej (j=1, 2 . . . , N), and the column vector thereof is represented by Mathematical Formula 2.
[Mathematical Formula 2]

$$\vec{e} = (e_1, \ldots, e_N)^T \quad (2)$$

Thus, an example of the encoding method may be represented by Mathematical Formula 3 using a matrix G (the element thereof being gij (i=1, 2, . . . , N, j=1, 2, . . . , n)).
[Mathematical Formula 3]

$$\vec{e} = G \cdot \vec{d} \quad (3)$$

At this time, assume that n (<N) pieces of encoded data (divided data) represented by Mathematical Formula 4 reach the terminal 3 side.
[Mathematical Formula 4]

$$\vec{e}' \quad (4)$$

The n (<N) pieces of encoded data are arbitrarily selected from the column vector represented by Mathematical Formula 2.
[Mathematical Formula 2]

$$\vec{e} = (e_1, \ldots, e_N)^T \quad (2)$$

This can be represented by Mathematical Formula 5.
[Mathematical Formula 5]

$$\vec{e}' = K \cdot \vec{e} \quad (5)$$

In Mathematical Formula 5, the matrix K (the element thereof being kij (i=1, 2, . . . , n, j=1, 2, . . . , N)) refers to a matrix in which assuming that the encoded data ej reaches i-th in the order of time reaching the terminal 3, kij=1 is satisfied. Here, if Mathematical Formula 6 is satisfied, Mathematical Formula 7 is also satisfied.

[Mathematical Formula 6]

$$G' = K \cdot G \quad (6)$$

[Mathematical Formula 7]

$$\vec{e}' = K \cdot \vec{e}$$

$$= K \cdot G \cdot \vec{d}$$

$$= G' \cdot \vec{d} \quad (7)$$

Thus, if an inverse matrix of the matrix G' is calculated, Mathematical Formula 8 is satisfied.
[Mathematical Formula 8]

$$\vec{d} = G'^{-1} \cdot \vec{e}' \quad (8)$$

Therefore, the original data di may be obtained.

Here, G' is a square matrix having a size n, in which n pieces of data selected from the N-piece row vector of G represented by Mathematical Formula 9, are arranged.
[Mathematical Formula 9]

$$\vec{g}_i = (g_{i1}, \ldots, g_{in}) \quad (9)$$

In Mathematical Formula 9, i=1, 2, . . . , N.
Here, assume that G is constituted so that the n pieces of data arbitrarily selected from N pieces represented by Mathematical Formula 9, are independent from each other.
[Mathematical Formula 9]

$$\vec{g}_i = (g_{i1}, \ldots, g_{in}) \quad (9)$$

In this case, G' always has an inverse matrix, and thus, it may be understood that the n pieces of data di(i=1, 2, . . . , n) may be reconstituted by Mathematical Formula 4.
[Mathematical Formula 4]

$$\vec{e}' \quad (4)$$

Such a matrix G may be a Vandermonde matrix as represented by Mathematical Formula 10.
[Mathematical Formula 10]

$$\begin{bmatrix} 1 & x_1 & x_1^2 & \ldots & x_1^{N-1} \\ 1 & x_2 & x_2^2 & \ldots & x_2^{N-1} \\ 1 & x_3 & x_3^2 & \ldots & x_3^{N-1} \\ \vdots & \vdots & \vdots & \ddots & \vdots \\ 1 & x_{n-1} & x_{n-1}^2 & \ldots & x_{n-1}^{N-1} \\ 1 & x_n & x_n^2 & \ldots & x_n^{N-1} \end{bmatrix} \quad (10)$$

Namely, according an example of the present embodiment, the dividing unit 52 multiplies the Vandermonde matrix G by the column vector, the elements of the column vector being the transmission objective data di, and thereby, the encoded data ej (j=1, 2, . . . , N) is obtained as divided data. In the present example, as far as n pieces of divided data can be obtained, the n being the number corresponding to the number of pieces of the transmission objective data, the transmission objective data may be reproduced (in other word, in the present example, m=n).

In accordance with the control by the transmission unit 53, the communication unit 23 sequentially transmits short-range communication signals each including each of the N-pieces of divided data (encoded data ej (j=1, 2, . . . , N)) output from the dividing unit 52. Specifically, as exemplified in FIG. 4, the transmission unit 53 adds each divided data output from the dividing unit 52 with a header (H) which includes information (T) representing a content type, content identification information (CN) unique to each transmission objective data, and element identification information (SN) unique to each divided data, and generates N data elements (DF) each including the header (H) and each divided data. Here, the index j of the divided data ej (j=1, 2, . . . , N) itself may be used for the element identification information.

Figure 4:
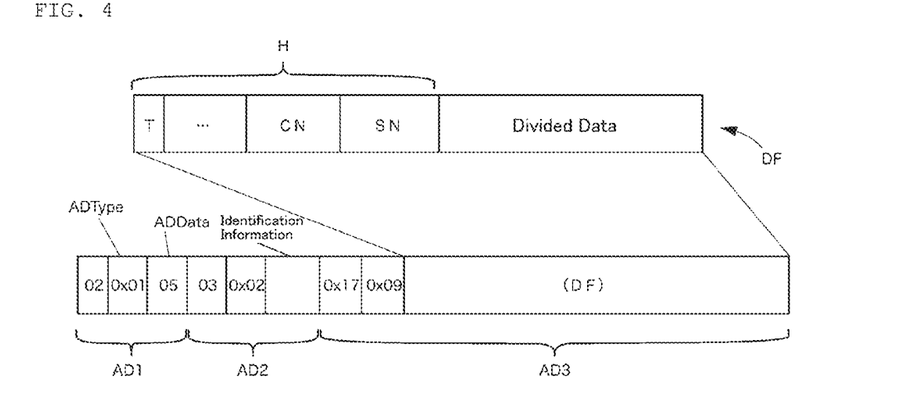
FIG. 4 is an explanatory view showing an example of an information content transmitted by an information transmission apparatus according to an embodiment of the present disclosure.

The information (T) representing the content type may be, for example, may be selected for each transmission objective data content from predetermined values such as "00" for "emergency report", "01" for "correspondence", "02" for information of the category "gourmet", and so on.

Also, in order that the length of each data element becomes a predetermined length, the transmission unit 53 performs padding of bits representing "0" on the end, etc., when the length is not enough. For example, when the divided data has 10 bytes at the maximum, the header portion is 6 bytes, and the data element should have a length of 18 bytes, padding of "0" is performed for 2 bytes.

The transmission unit 53 transmits the data elements by converting each data element to ASCII data. For example, the data element may be encoded by a widely known method, such as Base 64, etc. As a result of encoding, if a character string corresponding to the padding (padding at the time of data fragment generation) is included on the end, the character string corresponding to the padding (when padding of "0" is performed, the character string is a succession of "A") may be excluded. For example, if the data element is, as aforementioned, 18 bytes (144 bits) including the padding of "0" for 2 bytes on the end, and encoding is performed by Base 64, a character string having 24 bytes in total and having "AA" as the two characters on the end, can be obtained. The two characters on the end is a character string corresponding to the padding at the time generating the data element. Thus, the transmission unit 53 deletes the two characters on the end, and generates an encoded data element having 22 bytes in total.

The transmission unit 53 adds each of N data elements generated corresponding to each of the data fragments, with a predetermined header, etc., to generate N packets having a format compatible to the protocol of the short-range communication signal, and outputs the generated N packets to the communication unit 23 so that the packets are sequentially transmitted as short-range communication signals.

Specifically, if a BLE advertisement packet is used for the short-range communication signal, as shown in FIG. 4, the data of the packet generated by the transmission unit 53 is constituted to include a plurality of advertisement elements (ADk(k=1, 2, . . . )). Here, each advertisement element is constituted to include an element length (1 byte) at the head, information representing the element type (AD Type), and content data (AD Data).

According to an example of the present embodiment, the transmission unit 53 functions to include a data element as the content data of the third advertisement element (AD3). Assume that the type information of the third advertisement element is 0x09 representing "Complete Local Name" (0x represents that the subsequent numerals are hexadecimal numerals.)

According to the example of FIG. 4, the data of the packet generated by the transmission unit 53 includes Flag (element type information being "0x01", content data here being "05") as the first advertisement element (AD1). Further, the data of the packet generated by the transmission unit 53 includes identification information (element type information being "0x02", content data being data predetermined as identification information) as the second advertisement element (AD2). The transmission unit 53 may control the communication unit 23 to sequentially and repeatedly transmit packet data including N data elements which are different from each other.

Figure 5:
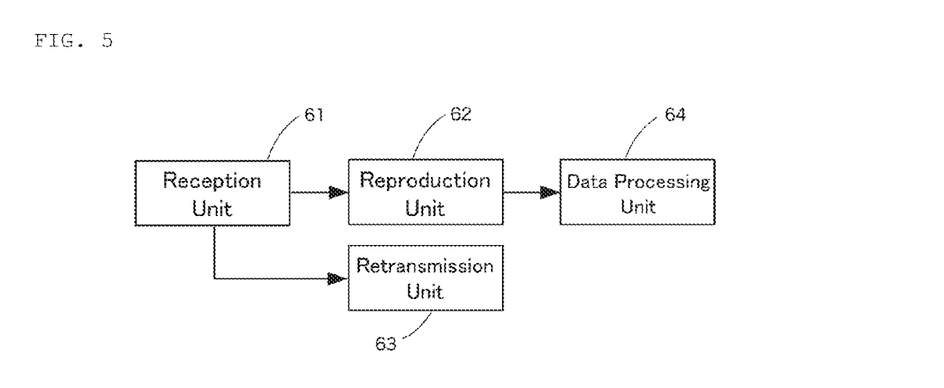
FIG. 5 is a functional block diagram showing an example of a terminal apparatus according to an embodiment of the present disclosure.

Also, as exemplified in FIG. 5, the control unit 31 on the terminal apparatus 3 functionally comprises a reception unit 61, a reproduction unit 62, a retransmission unit 63, and a data processing unit 64. Here, the reception unit 61 receives data included in the short-range communication signals received by the short-range communication unit 35a. According to the present embodiment, the short-range communication signals sequentially transmitted for N times by the information transmission apparatus 2 respectively contain data elements which are different from each other. The short-range communication unit 35a of the terminal apparatus 3 receives short-range communication signals for k-times (k≤N), among the N-times short-range communication signals. The reception unit 61 of the control unit 31 receives the data included in the k-times short-range communication signals (including k-pieces of data element). The reception unit 61 stores the data included in each short-range communication signal in the order of the reception from the earliest, in the storage unit 32.

As mentioned below, according to the present embodiment, the terminal apparatus 3 itself transmits packet data including each data element. Further, according to the present embodiment, the short-range communication unit 35a of the terminal apparatus 3 also receives the packet data transmitted form other terminal apparatus 3, and the reception unit 61 also receives the data contained in the short-range communication signals received by the short-range communication unit 35a from other terminal apparatus 3.

The reproduction unit 62 tries to reproduce the data using the data elements included in the received data. Specifically, the reproduction unit 62 continues the reception of the data including the data elements until the number of data elements becomes a predetermined number m or more (the number being the number of data elements necessary for reproducing the original transmission objective data), the data elements received by the short-range communication unit 35a being different from each other (data elements being contained in packet data having mutually different element identification information SN), and the data elements having a common content identification information (CN).

When m or more data elements which are different from each other and which have a common content identification information (CN) are stored in the storage unit 32, the reproduction unit 62 of the terminal apparatus 3 tries to reproduce the transmission objective data on the basis of the values of the data elements. Specifically, as mentioned above, when data fragments encoded by Base 64 are included in the short-range communication signals, the reproduction unit 62 decodes each data element included in the data stored in the storage unit 32, and then, extracts the divided data included in the decoded data elements. Here, if the divided data is encoded using the Vandermonde matrix, the reproduction unit 62 generates a column vector w (corresponding to vector e') in which values of the m-pieces of divided data are arranged as column elements in a predetermined order (for example, in the order of receipt time from the earliest).

Then, the reproduction unit 62 initializes a variable l as l=1, and acquires information j representing the number in the order of the data elements of the divided data from the start regarding the 1-th received data element (namely, representing that the 1-th received data element is a data element of the j-th piece ej of the divided data). As already mentioned above, the number in the order of the pieces of the divided data from the start, regarding the divided data ej, from which each data element is formed (namely, the number assigned to j), may be specified by the element identification information SN. The reproduction unit 62 sets $k_{xy}(x=1, 2, \ldots, m, y=1, 2, \ldots, N)$ so that $k_{lr}=1$ and $k_{lp}(p \neq r)=0$ are satisfied.

Subsequently, the terminal 2 continues incrementing the variable l by 1 to determine values of $k_{xy}$ (x=1, 2, ..., m, y=1, 2, ..., N), and thereby a matrix K having the values of $k_{xy}$ as elements is obtained. Here, the reproduction unit 62 multiplies the obtained matrix K, from the right, by the Vandermonde matrix G used by the information transmission apparatus 2 upon generating the divided data, to obtain the matrix G'.

The reproduction unit 62 obtains the inverse matrix of the matrix G' by calculation, and multiplies the column vector w by the obtained inverse matrix $G'^{-1}$, to thereby reproduce the transmission objective data. Accordingly, as far as the number of the data elements (data elements which are different from each other) is m or more, the original transmission objective data can be reproduced on the basis of any combination of the data elements. When the transmission objective data is reproduced as above, the reproduction unit 62 outputs the reproduced data to the data processing unit 64.

The retransmission unit 63 transmits short-range communication signals which include data elements received by the reception unit 61. Specifically, when the retransmission unit 63 is activated, the retransmission unit 63 may reset a storage area for the information which identifies the data element included in the packet data transmitted by the retransmission unit 63 itself (the information may include the element identification information, or both the element identification information and the content identification information, and hereinafter, the information is referred to as retransmitted data identification information).

The retransmission unit 63 extracts one piece of data, i.e., the first stored piece of data among the pieces of data stored in the storage unit 32 (in other words, a piece of data which has received first, among the pieces of data stored in the storage unit 32), and deletes the extracted piece of data from the storage unit 32.

The retransmission unit 63 examines whether or not retransmitted data identification information of the extracted piece of data is stored to indicate the piece of data has already been transmitted. If the retransmitted data identification information is stored to indicate that the piece of data has already been transmitted, the extracted piece of data is disposed. Also, if the retransmitted data identification information is not stored; i.e., the piece of data has not already been transmitted, the extracted piece of data is directly output to the communication unit 35. The short-range communication unit 35a of the communication unit 35 transmits the piece of data as a short-range communication signal.

The data processing unit 64 executes a predetermined process using the data reproduced by the reproduction unit 62. As an example, the data processing unit 64 outputs the reproduced data to the display unit 14 to display thereon. Further, if the reproduced data indicates an image data, the data processing unit 64 may render an image on the basis of the data, and output and display the image. Further, if the reproduced data is information referring to a resource available through a network, such as an URL (Uniform Resource Locators), the data processing unit 64 may acquire the resource referred to by the information, and may execute processes such as displaying an image of the image information, making a sound of the sound information, etc., on the basis of the acquired resource. Also, if the reproduction data is information which can be executed, such as a program, etc., the data processing unit 64 may execute processes on the basis of the data.

The present embodiment is constituted as above, and operates as follows. Hereinafter, broadcast BLE advertisement packets are used as the short-range communication signals. As exemplified in FIG. 6, a terminal apparatus 3a is present around the information transmission apparatus 2 and within a BLE signal reachable range from the information transmission apparatus 2 (substantially several tens to several hundreds meters), whereas a terminal apparatus 3b is present on the boundary of the BLE signal reachable range from the information transmission apparatus 2 and within a BLE signal reachable range from the terminal apparatus 3a. Also, a terminal apparatus 3b is present on the external side of the BLE signal reachable range from the information transmission apparatus 2. The terminal apparatus 3b is present within the BLE signal reachable range from terminal apparatus 3b.

Figure 6:
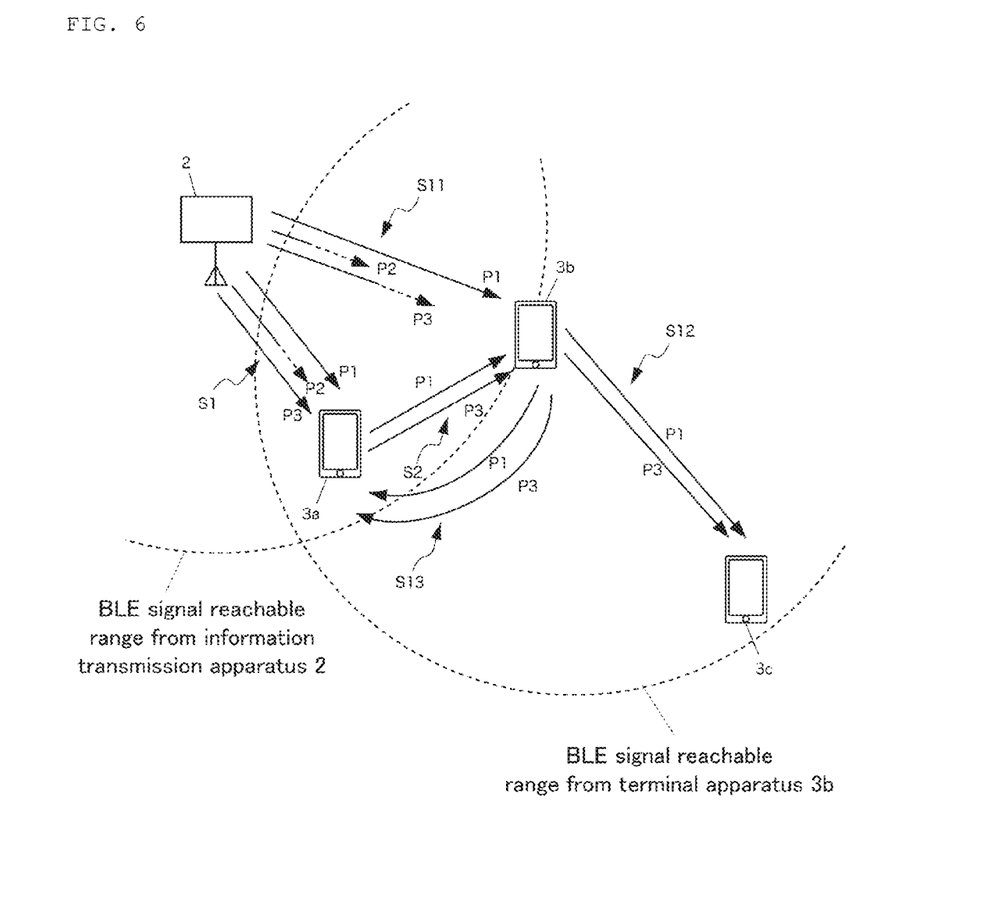
FIG. 6 is an explanatory view showing an operation example of an information transmission/reception system according to an embodiment of the present disclosure.

The information transmission apparatus 2 makes the transmission objective data redundant by a predetermined method, and divides the redundant data into N (N≥2) data elements, the transmission objective data being reproducible on the basis of any arbitrary combination of m (m<N) or more data elements. For explanatory purposes, N=3 and m=2 are satisfied in the following example. The information transmission apparatus 2 sequentially transmits BLE advertisement packets which are short-range communication signals respectively including mutually different N data elements obtained by the division. Here, the transmitted advertisement packets respectively includes different pieces of element identification information.

The mutually different N BLE advertisement packets transmitted from the information transmission apparatus 2 are received by the terminal apparatus 3a, the number of the received packets being at least m. On the other hand, assume that the terminal apparatus 3b receives x (x<m, and here, x=1) BLE advertisement packets.

Each terminal apparatus 3 stores the pieces of data included in the received short-range communication signals, in storage unit 32 in the order of receipt from the earliest, the signals being both the signals transmitted by the information transmission apparatus 2 and the signals transmitted by other terminal apparatuses 3.

Here, the terminal apparatus 3a receives m or more advertisement packets and stores the received packets in the storage unit 32. Specifically, assume that the terminal apparatus 3a receives two packets (m=2), i.e., P1 and P3, among the three packets (N=3), i.e., P1, P2, and P3, transmitted by the information transmission apparatus 2 (S1).

The terminal apparatus 3a tries to reproduce the data using the data elements included in the received advertisement packets P1 and P3. Here, m or more data elements are stored in the storage unit 32 of the terminal apparatus 3a, and thus, the terminal apparatus 3a reproduces the transmission objective data on the basis of the values of these data elements. Then, the terminal apparatus 3a executes a predetermined process such as displaying the reproduced data.

Also, the terminal apparatus 3a refers to the data stored in the storage unit 3 (data elements of the advertisement packets P1 and P3), and finds that the data elements have not been retransmitted (the data elements are not same as those transmitted in the past). Therefore, the terminal apparatus 3a sequentially transmits these advertisement packets P1 and P3 (S2).

The advertisement packets P1 and P3 transmitted by the terminal apparatus 3a are received by the terminal apparatus 3b located within the BLE signal reachable range from the terminal apparatus 3a.

Assume that, first, the terminal apparatus 3b receives only the advertisement packet P1 among the three (N=3) advertisement packets P1, P2, and P3 transmitted from the information transmission apparatus 2 (S11). The terminal apparatus 3b tries to reproduce the data using the data element included in the received advertisement packet P1. However, at this point, m or more data elements are not stored in the storage unit 32 of the terminal apparatus 3b, and thus, the terminal apparatus 3b waits until another advertisement packet is received.

Thereafter, when the terminal apparatus 3a sequentially transmits the advertisement packets P1 and P3, these advertisement packets P1 and P3 are received by the terminal apparatus 3b (S2). At this time, data D1 of the advertisement packet P1 and data D3 of the advertisement packet P1 are stored in the storage unit 32 of the terminal apparatus 3b in the order of D1, D1, and D3.

The terminal apparatus 3b tries to reproduce the data using the data elements included in the received advertisement packets P1 and P3. At this time, m or more mutually different data elements are stored in the storage unit 32 of the terminal apparatus 3b, and thus, terminal apparatus 3b executes the reproduction of the transmission objective data on the basis of the values of these data elements. Then, the terminal apparatus 3b executes a predetermined process such as displaying the reproduced data.

The terminal apparatus 3b sequentially extracts the data D1, D1, and D3 in the order of stored in the storage unit from the earliest. First, the earliest stored data D1 is determined as having not been transmitted (not the same as the data elements transmitted in the past), and this data D1 is transmitted as a BLE advertisement packet. The subsequently extracted data D1 is disposed since the D1 has already been retransmitted (same as the data element transmitted in the past). Further, the data D3 which is extracted thereafter, is determined as having not been transmitted (not the same as the data elements transmitted in the past), and thus, the data D3 is retransmitted as a BLE advertisement packet. Accordingly, as a result, the terminal apparatus 3b sequentially transmits the advertisement packets P1 and P3 (S12).

The terminal apparatus 3c located within the BLE signal reachable range from the terminal apparatus 3b sequentially receives the advertisement packets P1 and P3 transmitted from the terminal apparatus 3b (S12), reproduces the data on the basis of the received packets, and executes a process such as displaying the reproduced data.

Further, the advertisement packets P1 and P3 transmitted by the terminal apparatus 3b are also by the terminal apparatus 3a (S13). However, since the terminal apparatus 3a has already retransmitted the data D1 and D3 included in the advertisement packets P1 and P3 (same as the data elements transmitted in the past), the data is not retransmitted but disposed.

In the above explanation, when the data element received by each terminal apparatus 3 is the same as the data element which was transmitted in the past by the terminal apparatus 3, a short-range communication signal including the received data element is not transmitted, whereas when the data element received by each terminal apparatus 3 is not the same as the data element which was transmitted in the past by the terminal apparatus 3, a short-range communication signal including the received data element is transmitted. However, the present embodiment is not limited thereto.

Namely, assuming that the retransmission unit 63 of the terminal apparatus 3 transmits a short-range communication signal including the data element which has been transmitted before at a probability r, and transmits a short-range communication signal including the data element which has not been transmitted in the past at a probability p, information indicating these probabilities may be previously set and stored in the storage unit 32, etc. In general, p and r are set as p>r is satisfied. For example, when p=1 and r=0, the operations are the same as those described above.

When the probability is used, the retransmission unit 63 extracts the earliest stored piece of data among the pieces of data stored in the storage unit 32 (namely, the earliest received piece of data among the pieces of data stored in the storage unit 32), and deletes the extracted piece of data from the storage unit 32. Also, the retransmission unit 63 generates a random number R. The generation of the random number R may be performed by using, for example, a method for generating a series of numerical sequences uniformly distributed between "0" and "1" (since there is a widely know method, detailed explanation therefor is omitted here).

The retransmission unit 63 examines the retransmitted data identification information regarding the extracted piece of data to find out whether or not the retransmitted data identification information indicates that the extracted piece of data has already been transmitted. If the retransmitted data identification information indicates that the extracted piece of data has already been transmitted, whether or not the random number R is equal to or lower than the probability r (i.e., whether or not R≤r is satisfied, or whether or not R<r is satisfied) is examined, the probability r representing a probability of retransmitting a short-range communication signal including a data element transmitted in the past. Here, if R≤r (or R<r) is satisfied, the extracted piece of data is directly output to the communication unit 35. In this case, the piece of data is transmitted from the short-range communication unit 35a of the communication unit 35 as a short-range communication signal. If R>r (or R≥r) is satisfied, the retransmission unit 63 disposes the extracted piece of data.

Further, if the retransmitted data identification information does not indicate that the extracted piece of data has already been transmitted, the retransmission unit 63 examines or not the random number R is equal to or lower than the probability p (i.e., whether or not R≤p is satisfied, or whether or not R<p is satisfied) is examined, the probability p representing a probability of retransmitting a short-range communication signal including a data element which has not been transmitted before. Here, if R≤p (or R<p) is satisfied, the extracted piece of data is directly output to the communication unit 35. In this case, the piece of data is transmitted from the short-range communication unit 35a of the communication unit 35 as a short-range communication signal.

On the other hand, if the retransmitted data identification information does not indicate that the extracted piece of data has already been transmitted, or the random number R exceeds the probability p (R>p or R≥p is satisfied), the probability p representing a probability of retransmitting a short-range communication signal including a data element which has not been transmitted before, the retransmission unit 63 disposes the extracted piece of data.

Further, when the retransmission unit 63 determines whether or not retransmitting the received piece of data, a number representing the number of times of the retransmission regarding the relevant piece of data after the transmission from the information transmission apparatus 2 (usually referred to as a hop count), may be used. Namely, when the hop count exceeds a predetermined threshold value, the piece of data may not be retransmitted, and the hop count is lower than the threshold value, the piece of data may be retransmitted.

In this example, a numeral K representing the hop count is included in the data to be retransmitted (the numeral K may be included separate from the data element). The retransmission unit 63 of the terminal apparatus 3 determines whether or not the short-range communication signal including the piece of data should be retransmitted, the retransmission unit 63 refers to the numeral K and examines whether or not the numeral K is lower than the threshold value. Here, if the numeral K is not lower than the threshold value, the retransmission unit 63 disposes the piece of data.

If the numeral K is lower than the predetermined threshold value, the retransmission unit 63 increments the hop count value included in the piece of data by "1", updates the content of the data, and outputs the updated data to the communication unit 35. The updated piece of data is transmitted form the short-range communication unit 35a of the communication unit 35 as a short-range communication signal.

Further, a combination of the hop count and the above-mentioned probability may be used. When the combination is used, with respect to a piece of data transmitted in the past, if the hop count K is lower than the predetermined threshold value and the generated random number R satisfies R≤r (or R<r), the retransmission unit 63 outputs the updated data to the communication unit 35. Also, with respect to a piece of data which has not been transmitted before, if the hop count K is lower than the predetermined threshold value and the generated random number R satisfies R≤p (or R<p), the retransmission unit 63 outputs the updated data to the communication unit 35.

Also, the threshold value relating to the retransmission probability or the hop count may be determined to be different for each content type information (T) included in the data element. For example, when the content type information (T) represents a "emergency report", the threshold value relating to the hop count may be set relatively large, or the probabilities p and r may be set relatively large to satisfy, for example, p=r=1, so that the emergency report may be provided widely.

On the other hand, when the content type information (T) represents shop coupon information, and the like is included in the data element, the threshold value relating to the hop count may be set relatively small, the probability r may be set to satisfy r=0, and the probability p may be set relatively small, so that the retransmission probability becomes lower, and the data is not provided to a place far from the stop. Further, the setting may be the larger the hop count, the lower the probabilities p and r. Specifically, the probabilities p and r may be set as p=p0×exp(−h+1), r=r0×exp(−h+1), and the like, using the hop count value h. Here, p0 and r0 respectively correspond to the probabilities p and r when the hop count value h is "1".

According to these methods, the range that the data is to be provided may be adjusted, and the repetition of the retransmission may be prevented to thereby prevent the broadcast storm.

Further, according to the above explanation of the present embodiment, the retransmission unit 63 of the terminal apparatus 3 retransmits the receive data directly (or by updating the hop count). However, the present embodiment is not limited thereto. For example, the retransmission unit 63 of the terminal apparatus 3 may generate the data of the N short-range communication signals transmitted from the information transmission apparatus 2 again, using the transmission objective data reproduced by the reproduction unit 62 and according to the same process performed by the information transmission apparatus 2, and may sequentially transmit the short-range communication signals including the generated data.

The control unit 21 of the information transmission apparatus 2 according to the present embodiment may provided program execution environments which are independent from each other, such as a virtual machine, a resource container, etc. The wireless LAN communication unit 23b of the communication unit 23 may be shared among the program execution environments. Specifically, the control unit 21 executes a host OS executing a plurality of virtual machines in parallel, and also executes an operating system such as Linux (registered trademark), etc., on each virtual machine as a guest OS. A program may be executed on each guest OS for each data communication.

According to the present embodiment, the host OS sets a FIFO (First-In First-Out) type storage area which holds data to be transmitted from each guest OS through the wireless LAN communication unit 23b, and a FIFO type storage area which holds data to be received by each guest OS through the wireless LAN communication unit 23b, in the storage unit 22.

When there present data which should be transmitted through the wireless LAN, each guest OS stores the data in the above-mentioned storage area (FIFO which holds data transmitted from the guest OS through the wireless LAN communication unit 23b) provided by the host OS. Further, each guest OS accesses the FIFO type storage area which is provided by the host OS and which holds data to be received by the guest OS, at a predetermined time interval, and acquires the data to be received through the wireless LAN.

According to the present embodiment, the host OS also sets a FIFO type storage area which holds data to be transmitted by a specific guest OS through the short-range communication unit 23a, and a FIFO type storage area which holds data to be received by the specific guest OS through the short-range communication unit 23a, in the storage unit 22.

The specific guest OS stores the data which should be transmitted through the short-range communication unit 23a, in the above-mentioned storage area (FIFO which holds data transmitted from the specific guest OS through the short-range communication unit 23a) provided by the host OS. Further, the specific guest OS accesses the FIFO type storage area which is provided by the host OS and which holds data to be received by the specific guest OS, at a predetermined time interval, and acquires the data to be received through the short-range communication unit 23a.

In this example, the host OS disconnects the communication between the guest OS through the host OS (the communication through the external network such as a wireless LAN may not be disconnected).

Further, "channel identification information" may be included in the transmission objective data to be transmitted from the information transmission apparatus 2. In this case, the "channel identification information" which should be included in the data to be processed is set. In accordance with the setting, the terminal apparatus 3 selectively process (receive, reproduce, etc.,) only the data including the "channel identification information" determined to be processed.

Even when such a selective process using the channel identification information is performed, the terminal apparatus 3 may receive not only the data including the "channel identification information" which should be processed, but also all arrived data, and selectively reproduce the data including the "channel identification information" which should be processed, while executing processes regarding retransmission regardless of whether the data is determined to be processed. Further, the process regarding retransmission may also be performed for only the data including the "channel identification information" which should be processed.

According to the present embodiment, even if there is restriction regarding the size of the advertisement packet, any arbitrary message may be transmitted by dividing the message and including the divided message in a plurality of advertisement packets, and the reachable range of the advertisement packet may be expanded by retransmission, leading to the effective use of the short-range communication beacon.

[Example of Caching at Access Point]

According to the present embodiment, a wireless LAN access point capable of caching data may be arranged near the information transmission apparatus 2. Upon receiving reference information such as URL, etc., from the information transmission apparatus 2 or the terminal apparatus 3, the wireless LAN access point examines whether or not the data relating to the reference information is stored (cached). When the data relating to the reference information is not stored (cached), the wireless LAN access point acquires the data referred to by the reference information through the network, and transmits the acquired data to the information transmission apparatus 2 or the terminal apparatus 3, i.e., the transmission source of the reference information. At this time, the wireless LAN access point stores (caches) the acquired data in relation to the reference information to the source of the acquisition.

On the other hand, when the data relating to the reference information received from the information transmission apparatus 2 or the terminal apparatus 3 is stored (cached), the wireless LAN access point capable of caching data transmits the stored data to the information transmission apparatus 2 or the terminal apparatus 3, i.e., the transmission source of the reference information.

As aforementioned, when the data wireless LAN access point capable of caching is arranged nearby, if the reference information (URL, etc.) of the data capable of being acquired through the network is included in the transmission objective data, the information transmission apparatus 2 functions so that the wireless LAN access point capable of communicating from the information transmission apparatus 2 acquires the data referred to by the reference information, and stores (caches) the acquired data.

According to this example, when the terminal apparatus 3 receives a BLE advertisement packet including the above reference information, the terminal apparatus 3 sends the received reference information to the wireless LAN access point, and requests the data referred by the reference information through the wireless LAN access point, by a user's operation or without any human-induced operations. At this time, if the request can be directed to the wireless LAN access point capable of caching data, arranged near the information transmission apparatus 2, the terminal apparatus 3 can receive the data stored (cached) in the wireless LAN access point in accordance with the request from the information transmission apparatus 2, leading to the increase of the data acquisition speed.

[Example Using Shortened URL]

When transmitting the reference information to the terminal apparatus 3, the information transmission apparatus 2 may subject the reference information to encoding (referred to as shortening process) to covert the reference information to a URL having another character string using what is called a URL shortening technology. Such a URL shortening technology is widely known as shown in U.S. Pat. No. 6,957,224 ("Efficient retrieval of uniform, resource locators"), and a detailed explanation therefor is omitted here.

When the shortened. URL is used, the terminal apparatus 3 requests the data referred to by the shortened URL, to the wireless LAN access point. The data obtained by the wireless LAN access point through the network, in response to the request, includes the reference information before the shortening process. Upon receiving the reference information before the shortening process, the terminal apparatus 3 requests the data referred to by the received reference information (reference information before the shortening process), to the wireless LAN access point.

Further, when the wireless LAN access point capable of caching the data is arranged near the information transmission apparatus 2 using the shortened URL, the wireless LAN access point may operate as follows. In this example, the wireless LAN access point receives the reference information and the request for the data referred to by the information (the request may be a request for the cache), from the information transmission apparatus 2, and then, examines whether or not the received reference information is a shortened URL.

Specifically, whether the reference information is a shortened URL or not may be determined by previously listing and storing domains of providers providing a URL shortening service and determining whether or not the relevant URL corresponds to any the URL of the stored domain, or by actually acquiring the data referred by the shortened URL and determining that the URL is a shortened URL when the acquired data is a command for acquiring data referred to by another reference information (redirect command).

When the received reference information is determined as a shortened URL, the wireless LAN access point according to the present example examines whether or not the data related to the shortened URL is stored (cached). Here, if the data related to the shortened URL is not stored (cached), the data referred to by the shortened URL (data including reference information before the shortening process) is acquired through the network. The wireless LAN access point further acquires the data referred to by the reference information included in the data through the network, and transmits the data referred to by the reference information before the shortening process to the information transmission apparatus 2 (if the command received from the information transmission apparatus 2 is a request for cache, data transmission to the information transmission apparatus 2 is not necessary). Then, the wireless LAN access point stores (caches) the data referred to by the reference information before the shortening process in relation to the shortened URL received from the information transmission apparatus 2.

According to the present, the data referred to by the URL, etc., before the shortening process is stored in relation to the shortened URL, and thus, only the request for the data referred to by the shortened URL, from the terminal apparatus 3 to the wireless LAN access point leads to the transmission of the data referred to by the URL, etc., before the shortening process, corresponding to the shortened URL, to the wireless LAN access point. Therefore, data acquisition speed may be increased.

[Security]

According to the present embodiment, the data transmitted from the information transmission apparatus 2 to the terminal apparatus 3 is divided into a plurality of pieces of data. Therefore, longer data having a size longer than the data capable of being included in one packet such as a BLE advertisement packet can be directly transmitted. Here, "directly" means that the terminal apparatus 3 can reproduce the data to be transmitted from the information transmission apparatus 2 without further acquiring data from another place using the data received from the information transmission apparatus 2. Therefore, according to the present embodiment, the possibility that a malicious person introduces an access to a site managed by the malicious person himself/herself, by preventing himself as a proper sender, such as phishing, can be reduced.

While the present invention is described in terms of preferred or exemplary embodiments, it is not limited hereto.

What is claimed is:

1. An information transmission/reception system comprising an information transmission apparatus and a terminal,
   wherein the information transmission apparatus comprises
   a dividing device which generates N (N≥2) data elements from original transmission objective data, so that each of the N data elements is redundant with respect to and different from one another, the original transmission objective data being reproducible on the basis of any arbitrary combination of the m (m<N) or more data elements among the N data elements, and
   a transmission device which sequentially transmits BLE advertisement packets which can be transmitted/received without any authentication or connection processes, as short-range communication signals, which respectively include the N data elements obtained by the division, and
   each of the first and second terminals comprises
   a reception device which receives the data elements,
   a reproducing device which reproduces the original transmission objective data using the received m (m<N) or more data elements, and
   a retransmission unit which generates the N data elements from the reproduced original transmission objective data, using the predetermined method which is used in the dividing device of the information transmission apparatus, and which transmits BLE advertisement packets which can be transmitted/received without any authentication or connection processes, as short-range communication signals, including the N data elements,
   wherein even when one of the first and second terminals does not receive one or some of the data elements, the one of the first and second terminals can receive the one or some of the data elements from the other of the first and second terminals to reproduce the original transmission objective data.

2. A terminal apparatus comprising,
   a reception unit which receives data elements from an information transmission apparatus, the information transmission apparatus generating N (N≥2) data elements from the original transmission objective data, so that each of the N data elements is redundant with respect to and different from one another, the original transmission objective data being reproducible on the basis of any arbitrary combination of the m (m<N) or more data elements among the N data elements, and sequentially transmitting BLE advertisement packets which can be transmitted/received without any authentication or connection processes, as short-range communication signals, which respectively include the N data elements obtained by the division, a processor which performs a process for reproducing the original transmission objective data using the received data elements, and a retransmission unit which generates the N data elements from the reproduced original transmission objective data, using the predetermined method which is used in the dividing device of the information transmission apparatus, and which transmits BLE advertisement packets which can be transmitted/received without any authentication or connection processes, as the short-range communication signals, including the N data elements wherein even when the terminal does not receive one or some of the N data elements from another terminal, the terminal can receive the one or some of the N data elements from still another terminal to reproduce the original transmission objective data.

3. A terminal apparatus according to claim 2, wherein the transmission unit is controlled so that when the received data element is the same as the data element transmitted before, the short-range communication signal including the received data element is not transmitted.

4. A terminal apparatus according to claim 1, wherein the information transmission apparatus divides the original transmission objective data into N (N≥2) data elements according to an erasure code using Vandermonde matrix.

5. A terminal apparatus according to claim 2, wherein the transmission unit is controlled so that when the received data element is the same as the data element transmitted before, the short-range communication signal including the received data element is transmitted at a predetermined probability r, and when the received data element is not the same as the data element transmitted before, the short-range communication signal including the received data element is transmitted at a predetermined probability p where p>r, wherein the probability r represents a probability of retransmitting the short-range communication signals including a data element transmitted in past, and the probability p represents a probability of retransmitting the short-range communication signals including a data element which has not been transmitted before.

6. A terminal apparatus according to claim 5, wherein the probabilities p and r are set lower for the larger hop count.

7. A terminal apparatus according to claim 5, wherein the probabilities p and r are determined in advance to be different for each content type information included in the data element.

* * * * *